US010058775B2

(12) United States Patent
Segal

(10) Patent No.: US 10,058,775 B2
(45) Date of Patent: Aug. 28, 2018

(54) SYSTEM AND METHOD FOR INTERACTIVE MOBILE GAMING

(71) Applicant: Edo Segal, New York, NY (US)

(72) Inventor: Edo Segal, New York, NY (US)

(*) Notice: Subject to any disclaimer, the term of this patent is extended or adjusted under 35 U.S.C. 154(b) by 443 days.

(21) Appl. No.: 14/680,792

(22) Filed: Apr. 7, 2015

(65) Prior Publication Data
US 2015/0286375 A1 Oct. 8, 2015

Related U.S. Application Data

(60) Provisional application No. 61/976,441, filed on Apr. 7, 2014.

(51) Int. Cl.
G06F 3/0484 (2013.01)
A63F 13/216 (2014.01)
A63F 13/825 (2014.01)
A63F 13/235 (2014.01)
A63F 13/65 (2014.01)
A63H 3/00 (2006.01)
A63F 9/24 (2006.01)

(52) U.S. Cl.
CPC .......... A63F 13/216 (2014.09); A63F 13/235 (2014.09); A63F 13/65 (2014.09); A63F 13/825 (2014.09); A63H 3/00 (2013.01); A63F 2009/2442 (2013.01); A63F 2009/2486 (2013.01); A63F 2009/2489 (2013.01); A63H 2200/00 (2013.01)

(58) Field of Classification Search
CPC ...... A63F 13/65; A63F 13/825; A63F 13/216; A63F 2009/2442; A63F 2009/2486; A63F 2009/2489; A63H 3/00; A63H 2200/00
USPC ...................................... 463/31–34
See application file for complete search history.

(56) References Cited

U.S. PATENT DOCUMENTS

| 6,561,906 B2* | 5/2003 | Suzuki ............... G06K 9/46 463/31 |
| 8,294,958 B2* | 10/2012 | Paterson ............ G01B 11/2518 358/1.9 |
| 8,872,854 B1* | 10/2014 | Levitt ................ G06F 3/147 345/633 |
| 9,026,458 B2* | 5/2015 | Blatchley ............ G06Q 30/02 463/32 |

(Continued)

OTHER PUBLICATIONS

Krigslund, R. et al. "A Novel Technology for Motion Capture Using Passive UHF RFID Tags". No. 5 vol. 60. IEEE Transactions on Biomedical Engineering, May 2013. pp. 1453-1457.

Primary Examiner — Michael Cuff
(74) Attorney, Agent, or Firm — Leason Ellis LLP

(57) ABSTRACT

In one or more implementations, a system and method are provide that include an interactive gaming environment for providing a scene having a size and scale and in coordination with a figurine. Position sensors are arranged relative to the gaming environment, and circuitry that is configured to interrogate passive sensors are provided with the figurine. A processor that is configured to process information from the sensors computes at least a position and orientation of the figurine. A rendering module renders a virtual representation of the gaming environment, in accordance with the processed information from the sensors. The passive sensors can be provided inside the figurine. The passive sensors can include radio-frequency identification ("RFID") tags.

18 Claims, 7 Drawing Sheets

(56) References Cited

U.S. PATENT DOCUMENTS

| | | | | |
|---|---|---|---|---|
| 9,766,713 B2* | 9/2017 | West | | G06F 3/017 |
| 2006/0030410 A1* | 2/2006 | Stenton | | A63F 13/02 |
| | | | | 463/43 |
| 2007/0238520 A1* | 10/2007 | Kacmarcik | | A63F 13/10 |
| | | | | 463/33 |
| 2008/0194320 A1* | 8/2008 | Walsh | | G07F 17/3202 |
| | | | | 463/25 |
| 2008/0280684 A1* | 11/2008 | McBride | | A63F 13/12 |
| | | | | 463/42 |
| 2010/0026809 A1* | 2/2010 | Curry | | H04N 5/222 |
| | | | | 348/157 |
| 2013/0207345 A1* | 8/2013 | Gelinotte | | A63F 1/06 |
| | | | | 273/309 |
| 2014/0080605 A1* | 3/2014 | Peddi | | G09B 19/0038 |
| | | | | 463/32 |
| 2014/0100025 A1* | 4/2014 | Ackley | | A63F 1/14 |
| | | | | 463/29 |
| 2014/0342823 A1* | 11/2014 | Kapulkin | | A63F 13/355 |
| | | | | 463/31 |
| 2015/0054823 A1* | 2/2015 | Dzhurinskiy | | H04N 5/2226 |
| | | | | 345/419 |
| 2015/0149837 A1* | 5/2015 | Alonso | | G06K 7/10227 |
| | | | | 714/57 |
| 2015/0306496 A1* | 10/2015 | Haseltine | | A63F 13/213 |
| | | | | 463/31 |
| 2015/0375083 A1* | 12/2015 | Stelfox | | A61B 5/1113 |
| | | | | 700/91 |
| 2016/0044841 A1* | 2/2016 | Chamberlain | | A61N 1/3718 |
| | | | | 174/350 |
| 2016/0136534 A1* | 5/2016 | Earl-Ocran | | A63H 30/04 |
| | | | | 446/175 |
| 2016/0191893 A1* | 6/2016 | Gewickey | | H04N 13/025 |
| | | | | 386/223 |
| 2016/0364907 A1* | 12/2016 | Schoenberg | | G06T 17/205 |
| 2017/0061700 A1* | 3/2017 | Urbach | | G06F 3/011 |
| 2017/0068323 A1* | 3/2017 | West | | G06F 3/017 |
| 2017/0105052 A1* | 4/2017 | DeFaria | | H04N 21/2225 |
| 2017/0228939 A1* | 8/2017 | Dzhurinskiy | | G06T 19/006 |
| 2017/0228941 A1* | 8/2017 | Dzhurinskiy | | G06T 19/20 |

\* cited by examiner

SYSTEM AND METHOD FOR INTERACTIVE MOBILE GAMING

CROSS-REFERENCE TO RELATED APPLICATIONS

This application is based on and claims priority to U.S. Provisional Patent Application Ser. No. 61/976,441, filed on Apr. 7, 2014, the entire contents of which are respectively incorporated by reference as if set forth in its entirety herein.

FIELD

The present application relates, generally, to imaging and, particularly, to applications of processing image and/or spatial data.

BACKGROUND OF THE INVENTION

The increasing proliferation of mobile computing devices, such as smartphones, has resulted in users increasingly relying on such devices for recreational purposes, including for game playing. Accordingly, many electronic video games such as multi-player video games have overtaken traditional "physical" games, such as board games, in popularity. While electronic video games may provide many advantages over board games, such video games do not provide the same tangible, 'real world' gameplay experience, as reflected in certain board games through the use of figurines or gameplay pieces.

The present application addresses these and other considerations.

SUMMARY OF THE INVENTION

In one or more implementations, a system and method are provide that include an interactive gaming environment for providing a scene having a size and scale and in coordination with a figurine. Position sensors are arranged relative to the gaming environment, and circuitry that is configured to interrogate passive sensors are provided with the figurine. A processor that is configured to process information from the sensors computes at least a position and orientation of the figurine. A rendering module renders a virtual representation of the gaming environment, in accordance with the processed information from the sensors. The passive sensors can be provided inside the figurine. The passive sensors can include radio-frequency identification ("RFID") tags.

In one or more implementations, the rendering module further renders the virtual representation of the gaming environment including the figurine in the processed position and orientation.

In one or more implementations, the rendering module further renders the virtual representation of the gaming environment from a perspective of the figurine in the processed position and orientation.

In one or more implementations, the circuitry includes a plurality of active antennas that are configured to capture a polarization profile of the passive sensors.

In one or more implementations, the processor is configured to process respective signal strengths of the passive sensors to determine at least one of the position and orientation of the figurine.

In one or more implementations, at least one RFID shield is provided that reduces or eliminates electromagnetic interference.

In one or more implementations, the processor is configured in a mobile computing device, and the virtual representation of the gaming environment is rendered on a display configured with the mobile computing device.

In one or more implementations, a feature of the gaming environment is activated in the virtual representation when the figurine is placed in a particular location of the gaming environment.

Although the present invention has been described in relation to particular embodiments thereof, many other variations and modifications and other uses will become apparent to those skilled in the art. It is preferred, therefore, that the present invention not be limited by the specific disclosure herein.

DETAILED DESCRIPTION OF THE PREFERRED EMBODIMENTS

Figure 1:
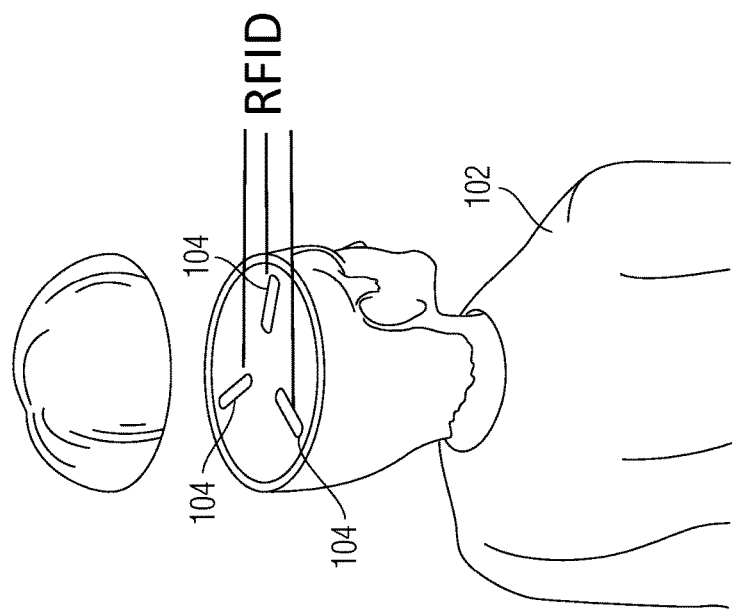
FIG. 1 is a simple diagram that represents a figurine 102 that is configured with three RFID tags.
Figure 1:
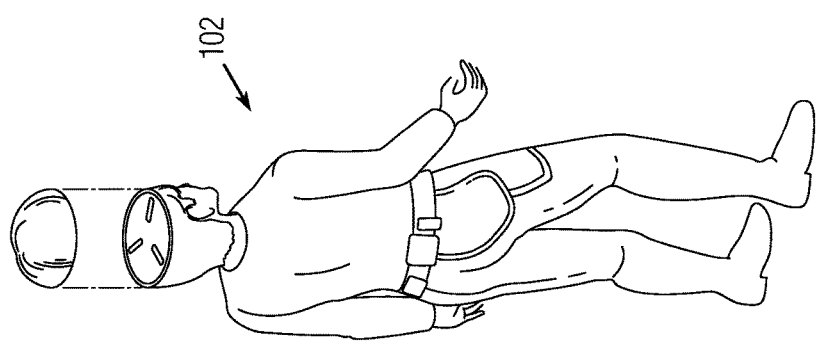

The present application provides a system and method for interactive gameplay that encourages physical play with digital extended experiences. In one or more implementations, a figurine is tracked within a gaming environment. The tracking can occur as a function of using a plurality of radio-frequency identification ("RFID") tags that are inside or otherwise coupled to the figurine. A plurality of sensors are configured in the gaming environment to interrogate the RFID tags. For example, the RFID tags may be placed inside the head of the figurine to allow tracking of the position of the head in space.

*A Novel Technology for Motion Capture Using Passive UHF RFID Tags*, R. Krigslund; IEEE Transactions On Biomedical Engineering, Vol. 60, No. 5, May 2013, pp 1453-7, herein incorporated by reference in entirety, describes the utilization of UHF RFID tags and antenna readers to estimate and capture kinematic information.

In one or more implementations, at least three active antennas project energy in a gaming environment, which can be configured as a playset. The antennas may be, for example, dual polarized antennas that are configured to capture the polarization profile of RFID tags, thereby recording orientation in space, including during movement. An RFID tag antenna can have a single linear polarization, and the direction of the electric field follows longitudinal degrees from and the end of the antenna conductor. Tag information is, therefore, used to estimate orientation in space. The energy excites the passive sensors that are configured with a figurine that is positioned in the gaming environment. The passive sensors resonate at a particular frequency in response to the energy, and the antennas sense the resonating. In a further implementation the RFID tag contain memory storage elements of sufficient capacity to store identification information or user supplied information.

In one configuration, multiple RFID reader antennas are used to sense the location of the tags from several directions. In this configuration, the location of the tag within a three-dimensional area is captured. By processing information representing the signal strengths of the respective passive sensors, the X, Y and Z vectors can be calculated and used for determining the position and orientation of the figurine. In one or more implementations, an RFID Shield can be included to reduce or otherwise eliminate electromagnetic interference or haze caused by multiple RFID tags and/or multiple antennas. In a particular configuration, the antennas are configured to communicate with the tags at a rate sufficient to capture small movements of the object within location.

In one or more implementations, the information representing the signal strengths of the respective passive sensors is processed by an information processing apparatus or system employing time series or system state algorithms in order to provide continuous location and movement information. In one arrangement, the information representing the signal strengths of the passive sensors are processed using Kalman filtering, linear quadratic estimation, or non-linear estimation algorithms. For example, such an information processing system includes the use of prior tag information, additional sampling frequencies or signal samples and/or sensor fusion methods (e.g., Kalman filtering) to processes the information representing the signal strength of the RFID tag into information relating to the location and state of an object. Those skilled in the art will appreciate the various signal processing algorithms applicable to the information described.

Thus, movement of one or more figurines (or other objects) configured with multiple passive sensors can be characterized by kinetic trajectories which can be recorded and used in connection with the teachings herein. Moreover, antennas that are provided with the gaming environment can be oriented within observation angle that is normal to the saggital plane. The antennas provided with the gaming environment may be positioned such to be in a respective rotation to provide an optimal reading.

In operation, as the figurine and/or head of the figurine moves (e.g., as a child moves the figurine within gaming environment), information from the sensors is processed to compute at least a position and orientation of the figurine and/or head. Using the information, a rendering module renders a virtual representation of the gaming environment, including as a function of the figurine. In one or more implementations, a mobile computing device (e.g., a smart phone, PDA, tablet computer or other mobile device) is configured with software that displays the gaming environment as it would appear as seen through the eyes of the figurine. Elements within the gaming environment appear to come to life as the figurine moves about (or is moved about) the gaming environment.

For example, a figurine configured with RFID tags is shaped and appears as a well-known character in a movie. The gaming environment is configured with sensors and shaped as a spaceship associated with the character. The figurine is moved in front of a panel in the gaming environment that represents a view screen. When the figurine's head is placed in front of the panel, a mobile computing device configured with rendering software displays the view screen including stars and other space objects (spaceships, planets, meteors) as appropriate. As the figurine is moved away from the panel, the computing device displays other elements of the gaming environment, such as controls, chairs, walls or the like that make up the gaming environment.

In one or more implementations, a virtual controller is provided as motion tracking and small-scale granular movements (i.e. XYZ orientations) are determined. For example, when the figurine is placed in a particular location, such as a gun torrent, a game or feature in a game is activated. Thus, continuing with the previous example of the gaming environment in the form of a spaceship, as the figurine is placed in front of the gun torrent (or is seated in a chair in front of a gun torrent), shooting options in the game are automatically activated.

In one or more implementations of the present patent application, antennas can be placed in strategic positions in the gaming environment. In addition or in the alternative, antennas can be placed in a mat or other floor covering. The antennas provided in the gaming environment assist with tracking the position and orientation of the figurine. For example, an RFID signal return is triangulated and the orientation of polarization track to calculate both the position and orientation of the figurine and/or the head of the figurine. Using that information, a simulated point of view of the figurine is rendered. For example, using computer-generated imagery ("CGI"), a representation of the gaming environment, including one or more interactive elements and or iteration points are rendered. Games appear to "come to life" as a person (e.g. a child) plays with the figurine and gaming environment.

In one or more other implementations, RFID tags are placed on or with accessories that are usable with the interactive gaming environment. For example, a vehicle is configured with RFID tags. As the vehicle is moved within the gaming environment, its position and orientation is tracked and thereby enabling one or more gaming features. For example, as a vehicle that is configured with RFID tags moves about the gaming environment, a driver's viewpoint is displayed on a mobile computing device. Furthermore, the vehicle that is configured with RFID tags can operate in conjunction with a figurine that is also configured with RFID tags.

In addition, the present application supports use of multiple figurines that are configured with RFID tags and that may interact within a gaming environment, such as shown and described herein. For example, two figurines shaped as characters (e.g., a superhero and a villain) are tracked in the gaming environment. A user of a mobile computing device may select or otherwise identify the viewpoint of either or both of the respective figurines. For example, the villain is moved to draw a weapon. The mobile computing device displays the viewpoint of the superhero as the superhero "watches" the villain draw the weapon. Alternatively, a split screen display may be provided, in which each respective viewpoint is displayed in a side-by-side format. In yet another alternative, both figurines are displayed on the mobile computing device. As noted herein, the virtual representations are provided as a function of the rendering module, such as via CGI.

With reference now to the drawings, FIG. 1 is a simple diagram that represents a figurine 102 that is configured with three RFID tags (or other suitable passive sensors) that are positioned in the figurines head. As noted herein, the combination of using several RFID tags inside the head of a figurine allows for accurate tracking of the head's position in space.

Figure 2:
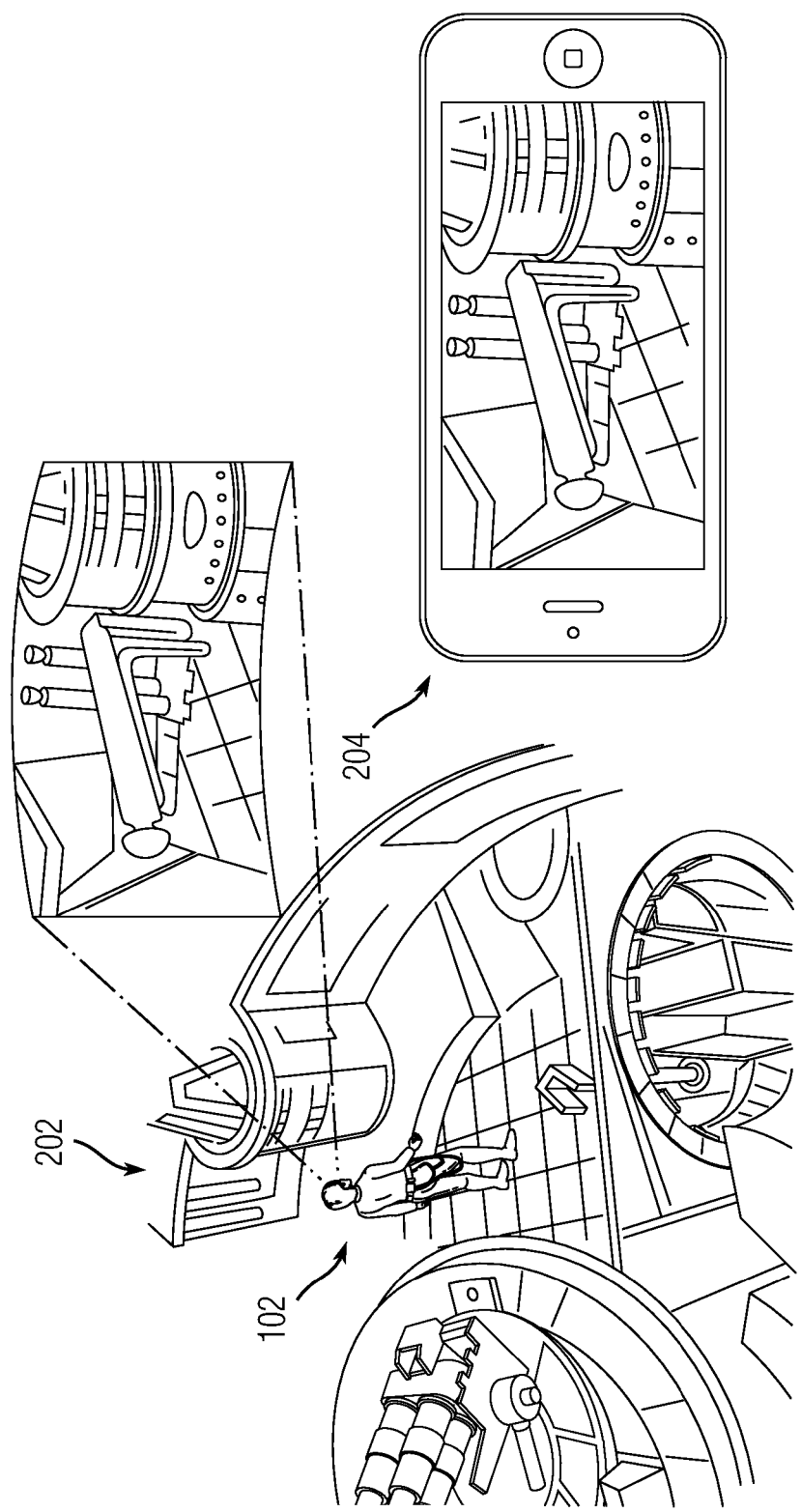
FIG. 2 is a simple wireframe diagram that illustrates an example implementation of the present application that includes a figurine and gaming environment.

FIG. 2 is a simple wireframe diagram that illustrates an example implementation of the present application that includes a figurine 102 and gaming environment 202. As shown in FIG. 2, the position and orientation of figurine 102 is computed, and a rendering of a virtual representation of the gaming environment 202 from the viewpoint of the figurine 102 is provided on computing device 204. As the figurine 102 moves within the gaming environment 202, the mobile computing device 204 is configured to render and display one or more sections of gaming environment 202.

Figure 3:
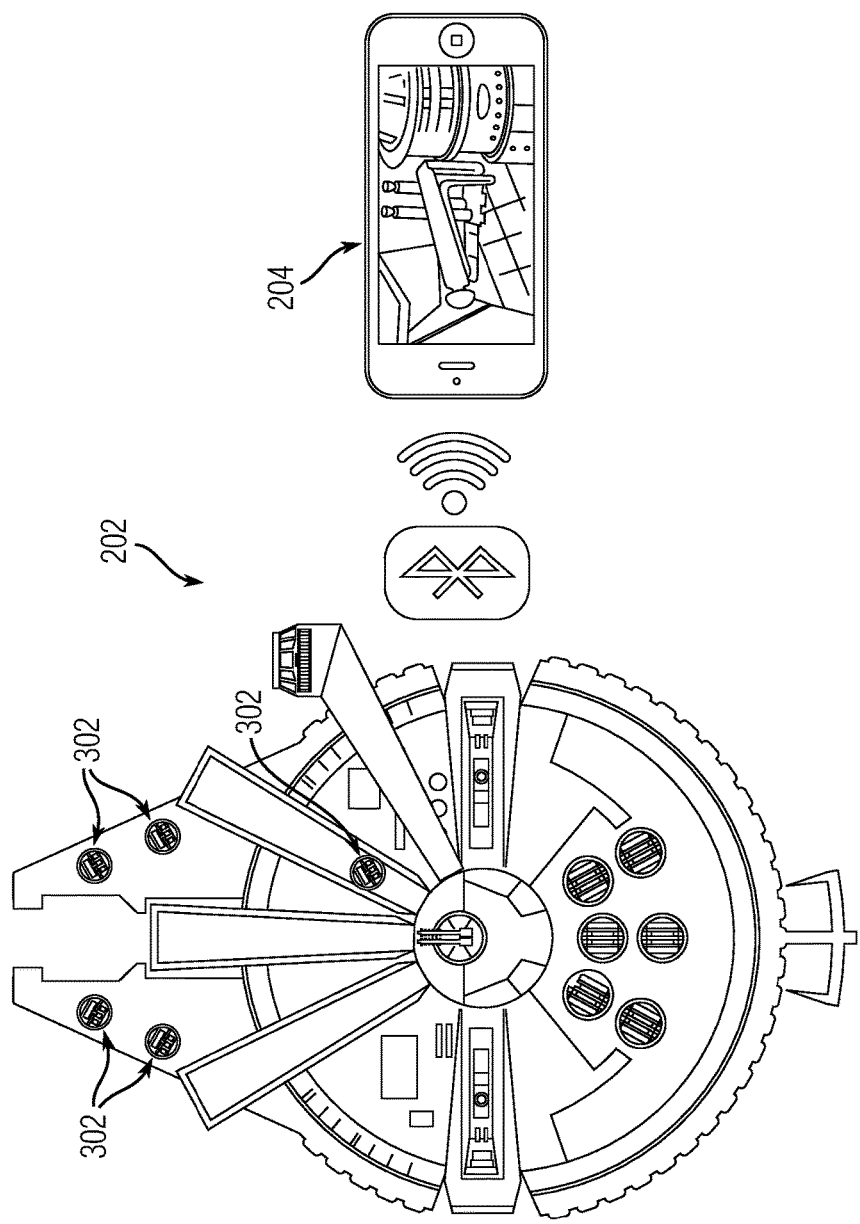
FIG. 3 is a simple wireframe diagram that illustrates a plurality of antennas respectively placed in a gaming environment.

FIG. 3 is a simple wireframe diagram that illustrates a plurality of antennas respectively placed in a gaming environment 202, which return a triangulated and orientation of polarization tracked from a respective figurine 102 configured with a plurality of passive sensors. Also as shown in FIG. 3 is computing device 204 that is shown rendering a virtual representation of the gaming environment 202 as passive sensors are detected and position and orientation of a figurine 102 (not shown) is computed.

Figure 4:
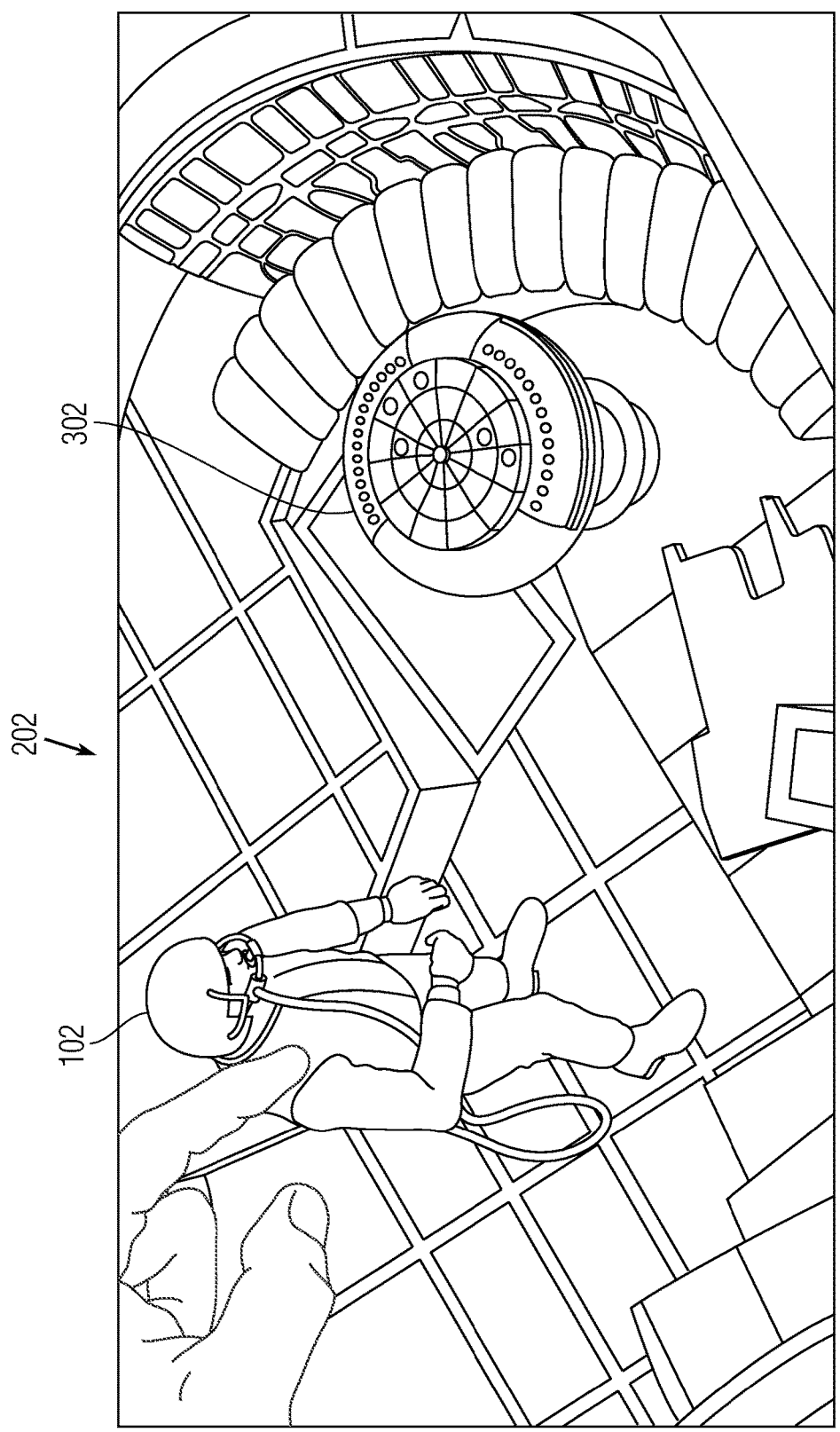
FIGS. 4-6 illustrate an example implementation of the present application that includes a figurine that is being moved within a gaming environment.
Figure 5:
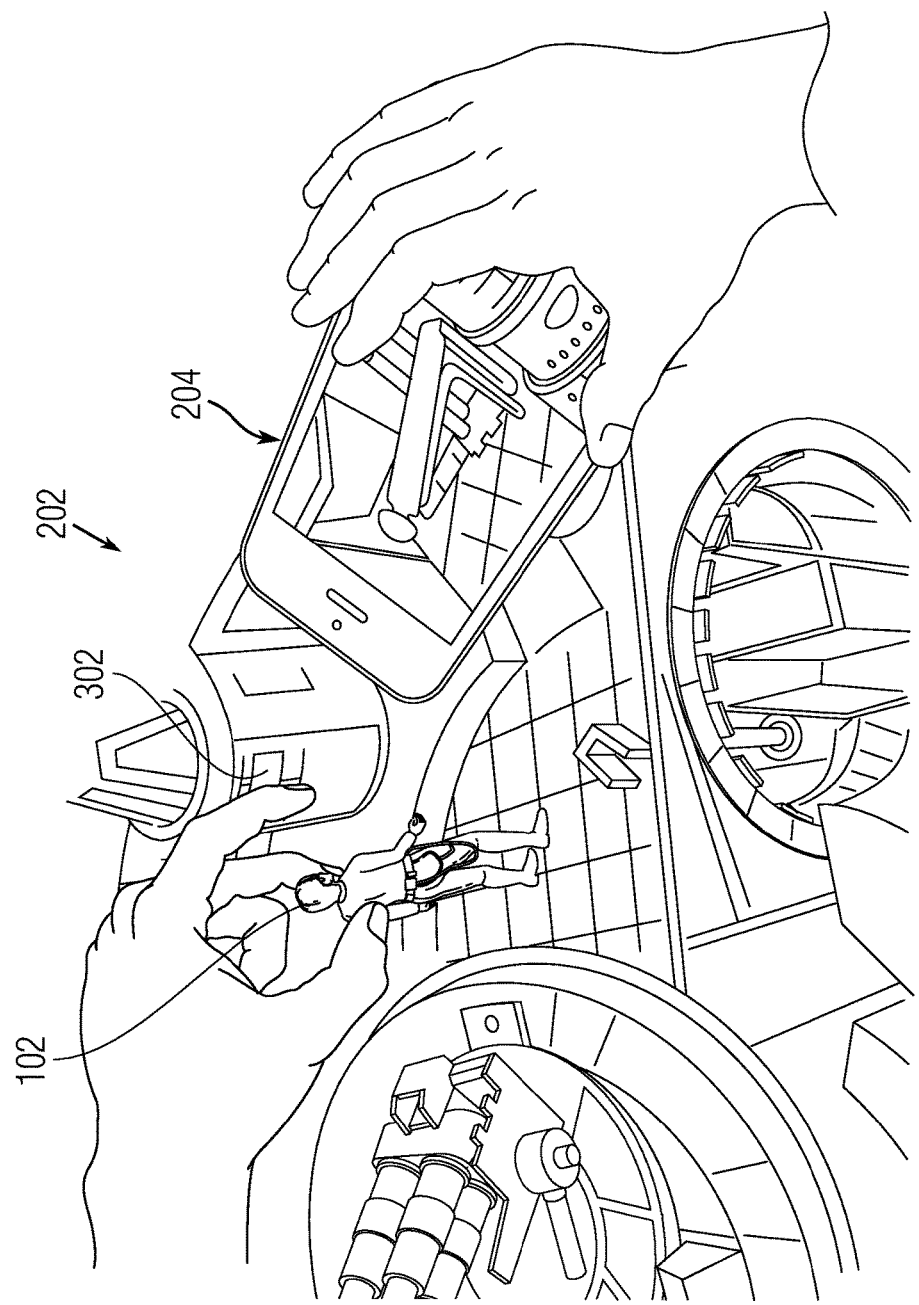
Figure 6:
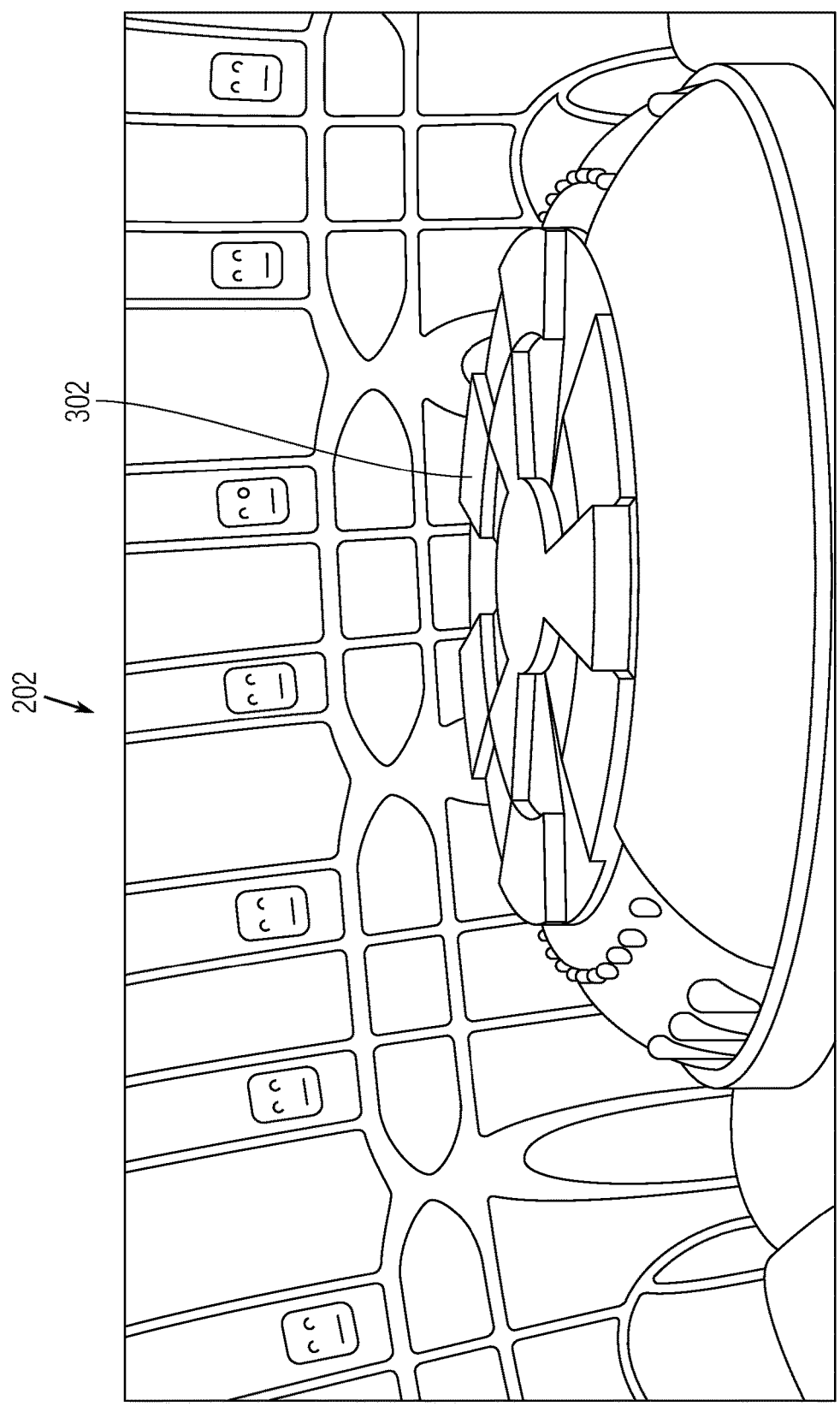
Figure 7:
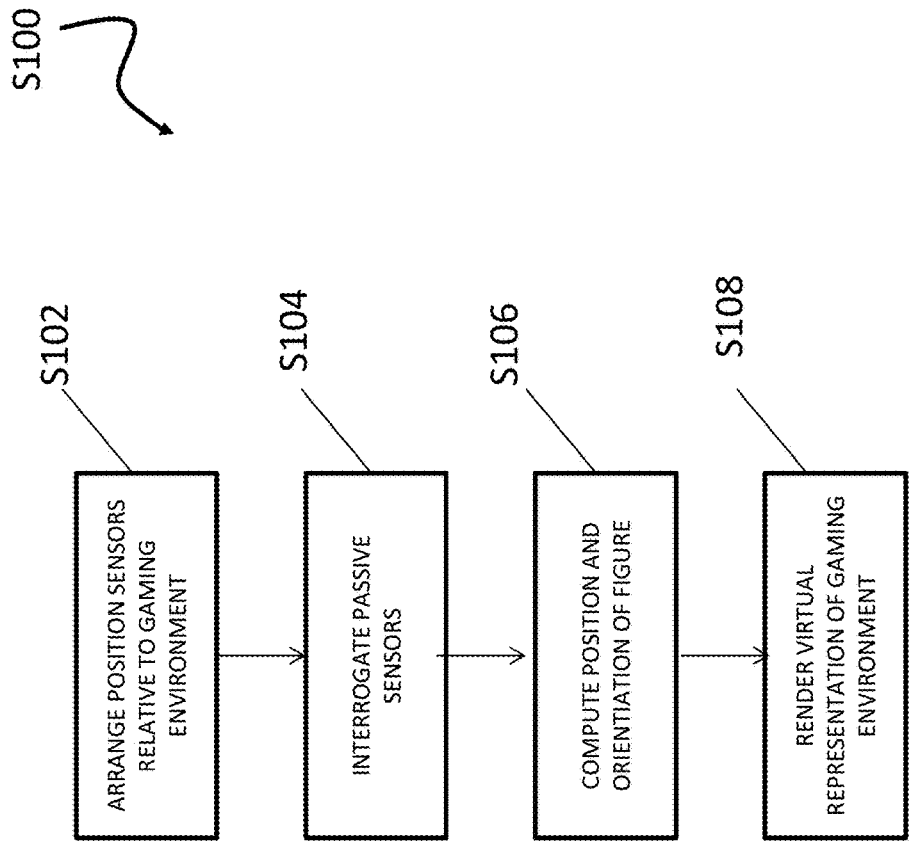
FIG. 7 is a flowchart that illustrates example steps in accordance with an example implementation of the present application.

FIGS. 4-6 illustrate an example implementation of the present application that includes a figurine 102 that is being moved within a gaming environment 202. As shown in FIG. 4, a figurine 102 is being moved by a person within the gaming environment 202 as a person moves the figurine about. In the example shown in FIG. 4, the gaming environment is configured as a spaceship. FIG. 5 illustrates use of a computing device 204 that is rendering a virtual representation of the gaming environment 202 as the user is moving the figurine 102 within the gaming environment 202. FIG. 6 is an example display that is provided on a mobile computing device 204. In the example shown in FIG. 6, a view is provided that corresponds to the visual viewpoint of the figurine 102 at the time that the figurine 102 is positioned within the gaming environment 202. Moreover, interaction of a user with a mobile computing device 204 is supported. For example, a figurine 102 that has been positioned at or near a control provided within gaming environment 202, such as a gun torrent, causes additional functionality. For example, the user appears to be firing the gun using the mobile computing device 204.

FIG. 8 is a flowchart that illustrates example steps S100 in accordance with an example implementation of the present application. At step S102, position sensors are arranged relative to a gaming environment. At step S104, the position sensors interrogate passive sensors that are configured, for example, within an example figurine 102. Using information associated with the passive sensors, the position and orientation of the figurine is computed (step S106). Thereafter, a virtual representation of the gaming environment is rendered (step S108).

Thus, as shown and described herein, a new gaming platform is provided such that children can view the world through the eyes of their physical toys. The present application provides an extremely low-cost solution to providing a new and powerful interactive gaming environment in which multiple viewpoints and displays can be rendered substantially in real time as figurines that are tracked via RFID or other suitable sensing signal(s). Visual features are made possible as a function of the present application without the need for expensive video transmission, cameras or other components that would otherwise be required.

Although the present application has been described in relation to particular embodiments thereof, other variations and modifications and other uses are included herein. It is preferred, therefore, that the present invention not be limited by the specific disclosure herein.

What is claimed:

1. A system that includes an interactive physical gaming environment for providing a scene having a size and scale and in coordination with a figurine, the system comprising:
   position sensors that are arranged relative to the physical gaming environment, each sensor including circuitry that is configured to interrogate at least one passive sensor, including a radio-frequency identification ("RFID") tag, that is provided with the figurine, wherein the at least one passive sensor responds when interrogated;
   a processor configured to execute instructions stored on processor readable media, wherein, when executing the instructions, the processor:
   processes information that is received in response to at least one of the position sensors interrogating at least one passive sensor;
   computes at least a position and orientation of the figurine, including as the figurine moves about the physical gaming environment; and
   renders a virtual representation of the physical gaming environment, wherein the rendered virtual representation is in accordance with the processed information and the computed position and orientation of the figurine.

2. The system of claim 1, wherein, when executing the instructions, the processor renders the virtual representation of the gaming environment including the figurine in the processed position and orientation.

3. The system of claim 1, wherein, when executing the instructions, the processor renders the virtual representation of the gaming environment from a perspective of the figurine in the processed position and orientation.

4. The system of claim 1, wherein the at least one passive sensor is provided inside the figurine.

5. The system of claim 1, wherein the circuitry includes a plurality of active antennas that are configured to capture a polarization profile of the at least one passive sensor.

6. The system of claim 1, wherein, when executing the instructions, the processor processes respective signal strengths of at least two of the passive sensors to determine at least one of the position and orientation of the figurine.

7. The system of claim 1, further comprising at least one RFID shield that reduces or eliminates electromagnetic interference.

8. The system of claim 1, wherein the processor is configured in a mobile computing device, and the virtual representation of the gaming environment is rendered on a display configured with the mobile computing device.

9. The system of claim 1, wherein a feature of the gaming environment is activated in the virtual representation when the figurine is placed in a particular location of the gaming environment.

10. A method for rendering a virtual representation of a physical gaming environment having a size and scale and in coordination with a figurine, the method comprising:
   providing position sensors that are arranged relative to the physical gaming environment, and configured to interrogate at least one passive sensor, including a radio-frequency identification ("RFID") tag, that is provided with the figurine, wherein the at least one passive sensor responds when interrogated;
   processing, by at least one processor configured to execute instructions stored on processor readable media, information that is received in response to at least one of the position sensors interrogating at least one passive sensor;

computing, by the at least one processor, at least a position and orientation of the figurine, including as the figurine moves about the physical gaming environment; and rendering, by the at least one processor, a virtual representation of the physical gaming environment, wherein the rendered virtual representation is in accordance with the processed information, and the computed position and orientation of the figurine.

11. The method of claim 10, further comprising rendering, by the processor, the virtual representation of the gaming environment including the figurine in the processed position and orientation.

12. The method of claim 10, further comprising rendering, by the processor the virtual representation of the gaming environment from a perspective of the figurine in the processed position and orientation.

13. The method of claim 10, wherein the at least one passive sensor is provided inside the figurine.

14. The method of claim 10, wherein the circuitry includes a plurality of active antennas that are configured to capture a polarization profile of the at least one passive sensor.

15. The method of claim 10, further comprising processing, by the processor, respective signal strengths of at least two of the at least one passive sensor to determine at least one of the position and orientation of the figurine.

16. The method of claim 10, further comprising reducing or eliminating, by at least one RFID shield, electromagnetic interference.

17. The method of claim 10, wherein the processor is configured in a mobile computing device, and the virtual representation of the gaming environment is rendered on a display configured with the mobile computing device.

18. The method of claim 10, wherein a feature of the gaming environment is activated in the virtual representation when the figurine is placed in a particular location of the gaming environment.

\* \* \* \* \*